(12) United States Patent
Kuno

(10) Patent No.: US 11,293,361 B2
(45) Date of Patent: Apr. 5, 2022

(54) CONTROL DEVICE FOR INTERNAL COMBUSTION ENGINE AND CONTROL METHOD FOR INTERNAL COMBUSTION ENGINE

(71) Applicant: TOYOTA JIDOSHA KABUSHIKI KAISHA, Toyota (JP)

(72) Inventor: Hirohito Kuno, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/157,097

(22) Filed: Jan. 25, 2021

(65) Prior Publication Data

US 2021/0231068 A1 Jul. 29, 2021

(30) Foreign Application Priority Data

Jan. 29, 2020 (JP) .............................. JP2020-012354

(51) Int. Cl.
*F02D 41/02* (2006.01)
*F02D 41/06* (2006.01)
(Continued)

(52) U.S. Cl.
CPC ......... *F02D 41/0235* (2013.01); *F01N 3/005* (2013.01); *F01N 3/2013* (2013.01);
(Continued)

(58) Field of Classification Search
CPC ............... F02D 41/0235; F02D 41/062; F02D 2041/1472; F02D 2200/0802; F01N 3/005;
(Continued)

(56) References Cited

U.S. PATENT DOCUMENTS 10,301,991 B1 5/2019 Dudar
10,876,451 B2 * 12/2020 Korenaga ............... F01N 11/00
(Continued)

FOREIGN PATENT DOCUMENTS

JP 2010-256994 A 11/2010
JP 2011-231710 A 11/2011
(Continued)

OTHER PUBLICATIONS

U.S. Appl. No. 16/545,094, filed Aug. 20, 2019.
(Continued)

*Primary Examiner* — Brandon D Lee
(74) *Attorney, Agent, or Firm* — Finnegan, Henderson, Farabow, Garrett & Dunner, LLP

(57) ABSTRACT

Provided is a control device for an internal combustion engine. The internal combustion engine includes, in an exhaust passage, an electrically heated catalyst device in which a catalyst is supported on a conductive base material) that generates heat when energized. The control device includes an electronic control unit configured to control the internal combustion engine such that, in a case where condensate is generated in the exhaust passage on the upstream side of the catalyst device in an exhaust flow direction, an engine output in a region where an engine load is equal to or greater than a predetermined load becomes smaller than in a case where condensate is not generated.

7 Claims, 5 Drawing Sheets

(51) Int. Cl.
*F01N 3/20* (2006.01)
*F01N 3/00* (2006.01)
*F02D 41/14* (2006.01)

(52) U.S. Cl.
CPC .... *F02D 41/062* (2013.01); *F01N 2900/1628* (2013.01); *F02D 2041/1472* (2013.01); *F02D 2200/0802* (2013.01)

(58) Field of Classification Search
CPC ........... F01N 3/2013; F01N 2900/1628; F01N 2900/1602; F01N 2900/1404; F01N 9/00; F01N 11/00; F01N 3/2006
See application file for complete search history.

(56) References Cited

U.S. PATENT DOCUMENTS

| | | | |
|---|---|---|---|
| 2010/0269805 A1 | 10/2010 | Fukuda et al. | |
| 2011/0265460 A1* | 11/2011 | Hirai | F01N 13/009 60/286 |
| 2014/0292350 A1* | 10/2014 | Yoshioka | F01N 3/2853 324/551 |
| 2014/0352283 A1* | 12/2014 | Kumagai | F01N 3/2013 60/286 |
| 2015/0285117 A1 | 10/2015 | Yoshioka | |
| 2020/0072108 A1 | 3/2020 | Korenaga | |

FOREIGN PATENT DOCUMENTS

| | | |
|---|---|---|
| JP | 2012-107567 A | 6/2012 |
| JP | 5733222 B2 | 6/2015 |
| WO | WO2013/108379 A1 | 7/2013 |

OTHER PUBLICATIONS

Office Action issued in U.S. Appl. No. 16/545,094 dated Jun. 26, 2020.

Notice of Allowance issued in U.S. Appl. No. 16/545,094 dated Oct. 13, 2020.

* cited by examiner

CONTROL DEVICE FOR INTERNAL COMBUSTION ENGINE AND CONTROL METHOD FOR INTERNAL COMBUSTION ENGINE

CROSS-REFERENCE TO RELATED APPLICATION

This application claims priority to Japanese Patent Application No. 2020-012354 filed on Jan. 29, 2020, incorporated herein by reference in its entirety.

BACKGROUND

1. Technical Field

The present disclosure relates to a control device for an internal combustion engine and a control method for the internal combustion engine.

2. Description of Related Art

WO 2013/108379 discloses an internal combustion engine including, in an exhaust passage, an electrically heated catalyst (EHC) device in which a catalyst is supported on a conductive base material. In addition, a control device for the internal combustion engine disclosed herein is configured to control heat energy received from exhaust gas by the conductive base material by controlling an operating state of the internal combustion engine such that an internal temperature difference in the conductive base material falls within a predetermined temperature range at a time of cold starting in order to restrict an occurrence of the internal temperature difference, which may cause a crack at the time of cold starting of the internal combustion engine, in the conductive base material.

SUMMARY

During an operation of the internal combustion engine, for example, when the temperature of an exhaust passage is low, moisture in exhaust gas might condense in the exhaust passage and condensate might be generated in the exhaust passage. When the condensate generated in the exhaust passage is scattered, comes into contact with the conductive base material, and evaporates, the conductive base material is partially and rapidly cooled by latent heat of evaporation. Accordingly, there is a concern that an internal temperature difference, which causes a crack, might occur in the conductive base material.

However, in WO 2013/108379 described above, rapid heating of the conductive base material by exhaust heat generated at the time of cold starting of the internal combustion engine is restricted, such that the occurrence of the internal temperature difference, which causes a crack, in the conductive base material is restricted. In other words, since a case where condensate is generated in the exhaust passage is not considered in WO 2013/108379 described above, there is a concern that an internal temperature difference, which causes a crack, might occur in the conductive base material due to the condensate generated in the exhaust passage.

The present disclosure provides a control device for an internal combustion engine and a control method for the internal combustion engine that restrict an occurrence of an internal temperature difference in a conductive base material due to condensate generated in an exhaust passage.

A first aspect of the present disclosure is a control device for an internal combustion engine. The internal combustion engine includes, in an exhaust passage, an electrically heated catalyst device in which a catalyst is supported on a conductive base material that generates heat when energized. The control device includes an electronic control unit configured to control the internal combustion engine such that, when condensate is generated in the exhaust passage on an upstream side of the catalyst device in an exhaust flow direction, an output of the internal combustion engine becomes smaller in a region where a load of the internal combustion engine is equal to or greater than a predetermined load than when the condensate is not generated.

In the above aspect, the electronic control unit may determine whether the condensate is generated in the exhaust passage on the upstream side of the catalyst device in the exhaust flow direction, and set, upon determining that the condensate is generated, an output upper limit value of the output of the internal combustion engine based on a temperature of the exhaust passage.

In the above aspect, the electronic control unit may reduce, when the temperature of the exhaust passage is low, the output upper limit value, as compared with a case where the temperature is high.

In the above aspect, the electronic control unit may determine whether the condensate is generated based on the temperature of the exhaust passage.

In the above aspect, the electronic control unit may calculate the temperature of the exhaust passage at a time of startup of the internal combustion engine based on a temperature of a body of the internal combustion engine when the internal combustion engine is stopped or a temperature of the body at the time of the stop, which is a temperature of a parameter correlated with the temperature, and the temperature of the body when the internal combustion engine is started a subsequent time after the internal combustion engine is stopped or the temperature of the body at the time of the startup, which is the temperature of the parameter.

In the above aspect, the electronic control unit may calculate the temperature of the exhaust passage during an operation of the internal combustion engine based on an amount of a change between the temperature of the exhaust passage at the time of the startup and the temperature of the exhaust passage during the operation that is calculated based on a state of the operation.

A second aspect of the present disclosure is a control method for an internal combustion engine. The internal combustion engine includes, in an exhaust passage, an electrically heated catalyst device in which a catalyst is supported on a conductive base material that generates heat when energized. The control method includes a step of determining, by an electronic control unit, whether condensate is generated in the exhaust passage on an upstream side of the catalyst device in an exhaust flow direction and a step of controlling, by the electronic control unit, the internal combustion engine such that, when the condensate is generated in the exhaust passage on the upstream side of the catalyst device in the exhaust flow direction, an output of the internal combustion engine becomes smaller in a region where a load of the internal combustion engine is equal to or greater than a predetermined load than when the condensate is not generated.

With the foregoing aspects of the present disclosure, in a case where condensate is generated in an exhaust passage, it is possible to reduce an amount of condensate that is pumped by exhaust gas and scattered on a conductive base material by reducing an output of an internal combustion engine in a region where a load of the internal combustion engine is equal to or greater than a predetermined load and restricting a flow rate of the exhaust gas to a certain amount. Therefore, it is possible to restrict an occurrence of an internal temperature difference in the conductive base material due to the condensate generated in the exhaust passage.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinbelow, embodiments of the present disclosure will be described in detail with reference to drawings. In addition, in the following descriptions, same components are designated by the same signs.

Figure 1:
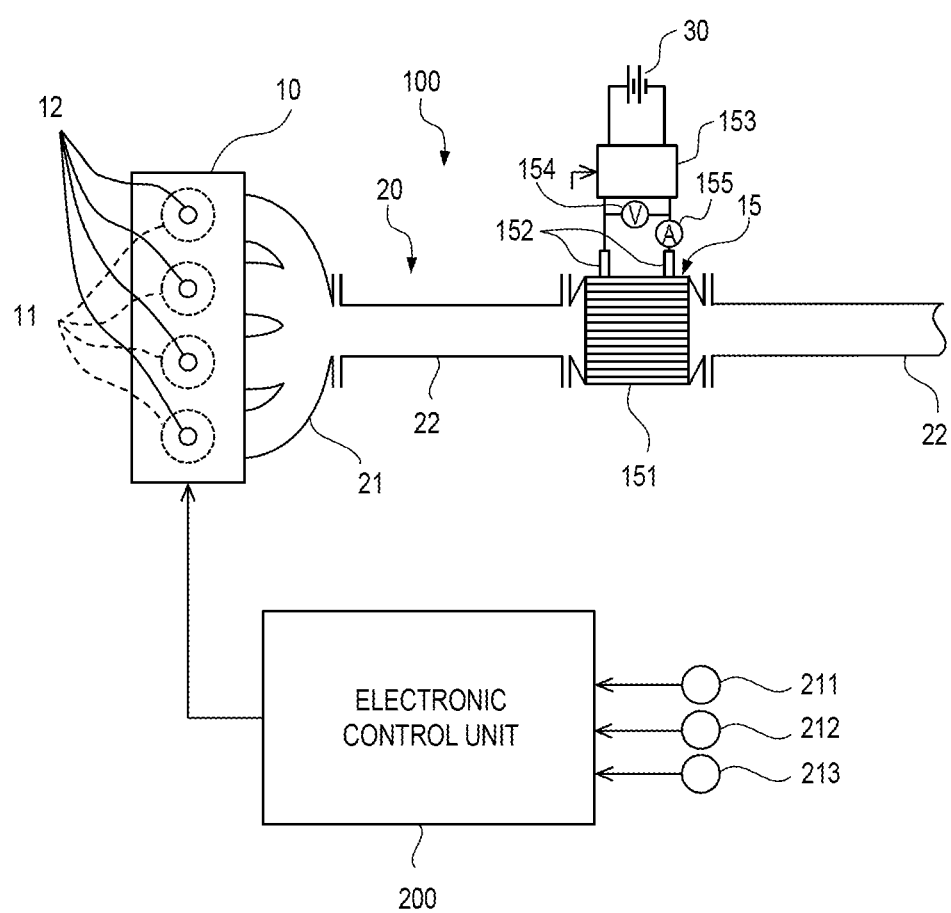
FIG. 1 is a diagram illustrating schematic configurations of an internal combustion engine and an electronic control unit that controls the internal combustion engine according to an embodiment of the present disclosure.

FIG. 1 is a diagram illustrating schematic configurations of an internal combustion engine 100 and an electronic control unit 200 that controls the internal combustion engine 100 according to an embodiment of the present disclosure.

The internal combustion engine 100 according to the present embodiment is a spark-ignition type gasoline engine, and includes an engine body 10 having a plurality of cylinders 11 and an exhaust device 20. The type of internal combustion engine 100 is not particularly limited, and may be a premixed compression ignition type gasoline engine or a diesel engine.

The engine body 10 generates power for, for example, driving a vehicle and the like, by burning fuel injected from a fuel injection valve 12 inside each cylinder 11. In FIG. 1, in order to prevent the figure from being complicated, an intake device, a spark plug, and the like, are not shown. Further, the fuel injection method is not limited to the in-cylinder direct injection, but may be a port injection.

The exhaust device 20 purifies exhaust gas (combustion gas) generated inside each cylinder 11 and discharges it to the outside air, and includes an exhaust manifold 21 and an exhaust pipe 22 as an exhaust passage, and an EHC device 15.

The exhaust gas generated in each cylinder 11 of the engine body 10 is collected by the exhaust manifold 21 and discharged to the exhaust pipe 22. The exhaust gas contains harmful substances, such as unburned gas (carbon monoxide (CO) and hydrocarbons (HC)) or nitrogen oxides (NOx). Therefore, in the present embodiment, the exhaust pipe 22 is provided with the EHC device 15 as a device for post-treatment of exhaust gas that removes harmful substances from the exhaust gas.

The EHC device 15 includes a conductive base material 151, a pair of electrodes 152, a voltage adjustment circuit 153, a voltage sensor 154, and a current sensor 155.

The conductive base material 151 is formed of a material, such as silicon carbide (SiC) or molybdenum di silicide ($MoSi_2$), which generates heat when energized. In the conductive base material 151, a plurality of passages (hereinafter referred to as "unit cells") each having a lattice-shaped (or honeycomb-shaped) cross-sections is formed along the flow direction of the exhaust gas, and the catalyst is supported on the surface of each unit cell. The catalyst supported on the conductive base material 151 is not particularly limited. A catalyst needed for obtaining desired exhaust gas purification performance can be appropriately selected from among various catalysts, such as an oxidation catalyst (a two-way catalyst) and a three-way catalyst, and supported on the conductive base material 151.

The electrodes 152 are used for applying a voltage to the conductive base material 151. The electrodes 152 are electrically connected to the conductive base material 151 and to the battery 30 via the voltage adjustment circuit 153, respectively. By applying the voltage to the conductive base material 151 via the electrodes 152, current flows through the conductive base material 151, such that the conductive base material 151 generates heat and the catalyst supported thereon is heated.

It is possible to adjust the voltage (hereinafter referred to as a "base material applied voltage") applied to the conductive base material 151 by the electrodes 152 by controlling the voltage adjustment circuit 153 using the electronic control unit 200. It is also possible, for example, to apply a voltage of the battery 30 as it is, or after stepping up or down the voltage of the battery 30 to any voltage. As such, in the present embodiment, power supplied to the conductive base material 151 can be adjusted to any degree of power by controlling the voltage adjustment circuit 153 using the electronic control unit 200.

The voltage sensor 154 detects the base material applied voltage. In the present embodiment, the voltage adjustment circuit 153 is controlled based on the base material applied voltage detected by the voltage sensor 154 such that the base material applied voltage becomes a predetermined rated voltage.

The current sensor 155 detects a value of the current flowing through the conductive base material 151 when the voltage is applied to the conductive base material 151.

The electronic control unit 200 is a microcomputer including a central processing unit (CPU), a memory, such as a read-only memory (ROM) and a random access memory (RAM), and an input port and an output port, which are connected to one another via bidirectional buses.

In addition to the voltage sensor 154 and the current sensor 155 described above, output signals from various sensors are input to the electronic control unit 200. Examples of the various sensors include a load sensor 211 that generates an output voltage proportional to a depression amount of an accelerator pedal, a crank angle sensor 212 that generates an output pulse each time a crankshaft (not shown) of the engine body 10 rotates by, for example, 15 degrees, as a signal for calculating the engine rotation speed $N_e$ or the like, and a coolant temperature sensor 213 that detects the temperature (hereinafter referred to as an "engine coolant temperature") of a coolant that cools the engine body 10.

The electronic control unit 200 controls the internal combustion engine 100 by activating each control component based on output signals of various sensors or the like that are input thereto.

When the internal combustion engine 100 is started, the exhaust gas discharged from each cylinder 11 of the engine body 10 flows through the exhaust pipe 22 and is finally discharged into the atmosphere. When warm-up of the catalyst device 15 has been completed, that is, when the temperature of the conductive base material 151 is equal to or higher than a predetermined activating temperature (for example, 450° C.) at which a purification function of the catalyst supported on the conductive base material 151 is activated, harmful substances in the exhaust gas can be purified in the catalyst device 15. On the other hand, when the warm-up of the catalyst device 15 has not been completed, harmful substances in the exhaust gas cannot be sufficiently purified in the catalyst device 15, and thus the discharge of the exhaust gas is worsened.

However, in the case of the internal combustion engine 100 that includes the EHC device 15 as in the present embodiment, it is possible to restrict worsening of the discharge of the exhaust gas after the engine startup by starting energization of the conductive base material 151 before the engine startup and completing the warm-up of the catalyst device 15 in advance, or by starting energization of the conductive base material 151 at the same time as the engine startup and completing the warm-up of the catalyst device 15 early.

On the other hand, after the engine startup, when the temperature of the exhaust pipe 22 on the upstream side of the conductive base material 151 in the exhaust flow direction is low, moisture in the exhaust gas is condensed in the exhaust pipe 22, and condensate (liquid water) is generated in the exhaust pipe 22. The condensate generated in the exhaust pipe 22 is pumped, by the exhaust gas, to the downstream side in the exhaust flow direction. When the condensate is scattered to the conductive base material 151, adheres to the conductive base material 151 of which the temperature is high immediately after or during the electric heating, and evaporates, the conductive base material 151 is partially and rapidly cooled by latent heat of evaporation. As a result, there is a concern that a temperature difference, which causes a crack, might occur in the conductive base material 151.

Therefore, in the present embodiment, when there is a possibility that condensate might be generated in the exhaust pipe 22, the amount of condensate scattered on the conductive base material 151 is reduced by limiting the engine output, as needed, and restricting a flow rate of the exhaust gas. Hereinafter, first, with reference to FIG. 2, control for calculating the temperature (hereinafter referred to as an "exhaust pipe temperature") of the exhaust pipe 22, which is necessary to determine whether condensate is generated in the exhaust pipe 22, will be described. Then, with reference to FIG. 5, the output control of the internal combustion engine 100 for reducing the amount of condensate scattered on the conductive base material 151 will be described.

Figure 2:
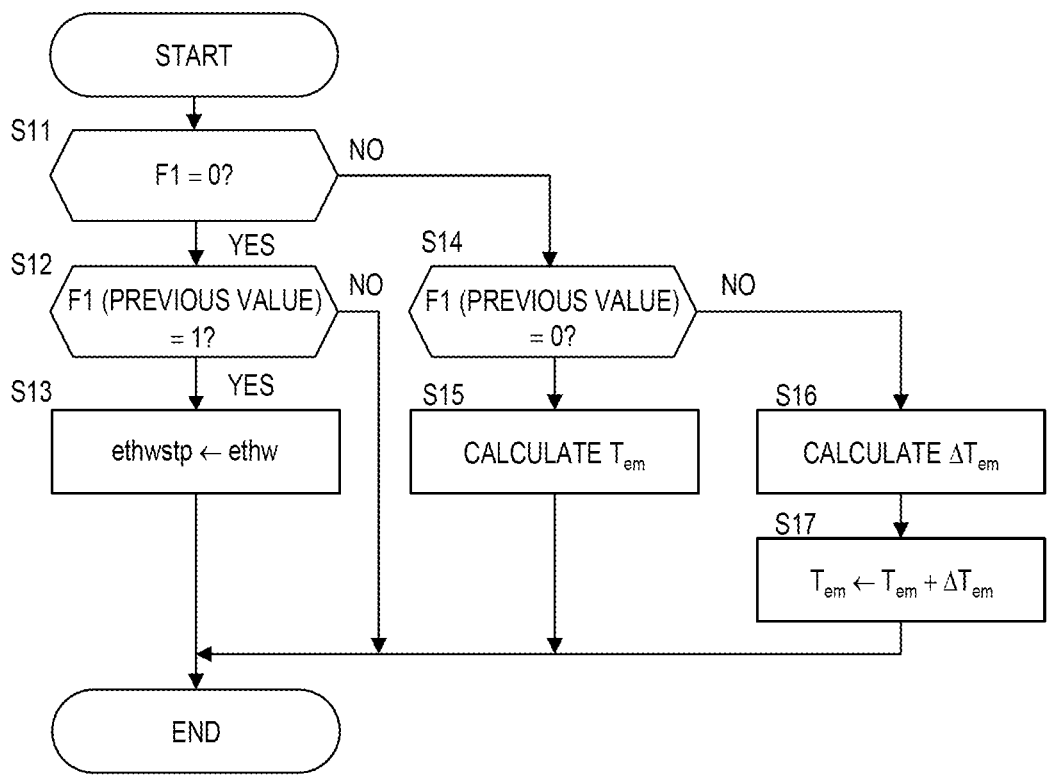
FIG. 2 is a flowchart describing control for calculating the temperature of an exhaust pipe according to an embodiment of the present disclosure.

FIG. 2 is a flowchart describing the control for calculating the exhaust pipe temperature according to the present embodiment. The electronic control unit 200 repeatedly executes this process at a predetermined calculation cycle (for example, 10 milliseconds).

In step S11, the electronic control unit 200 reads an engine operation flag F1 and determines whether the engine operation flag F1 is set to zero. The engine operation flag F1 is set separately from this process. When the internal combustion engine 100 is started, the flag is set to one, and when the internal combustion engine 100 is stopped, it is returned to zero. The initial value is set to zero. When the engine operation flag F1 is zero, the electronic control unit 200 proceeds to a process of step S12. On the other hand, when the engine operation flag F1 is one, the electronic control unit 200 proceeds to a process of step S14.

In step S12, the electronic control unit 200 determines whether a previous value of the engine operation flag F1 is one, that is, whether the current state is immediately after the engine stop (whether the current process is a first process after the engine stop). When the previous value of the engine operation flag F1 is one, that is, the current state is immediately after the engine stop, the electronic control unit 200 proceeds to a process of step S13. On the other hand, when the previous value of the engine operation flag F1 is zero, that is, when the engine is stopped, the electronic control unit 200 ends the current process.

In step S13, the electronic control unit 200 stores a current engine coolant temperature ethw [° C.] in the memory as an engine stop coolant temperature ethwstp.

In step S14, the electronic control unit 200 determines whether the previous value of the engine operation flag F1 is zero, that is, whether the current state is immediately after the engine startup (that is, whether the current process is a first process after the engine startup). When the previous value of the engine operation flag F1 is zero, that is, the current state is immediately after the engine startup, the electronic control unit 200 proceeds to a process of step S15. On the other hand, when the previous value of the engine operation flag F1 is one, that is, when the engine is in operation, the electronic control unit 200 proceeds to a process of step S16.

Figure 3:
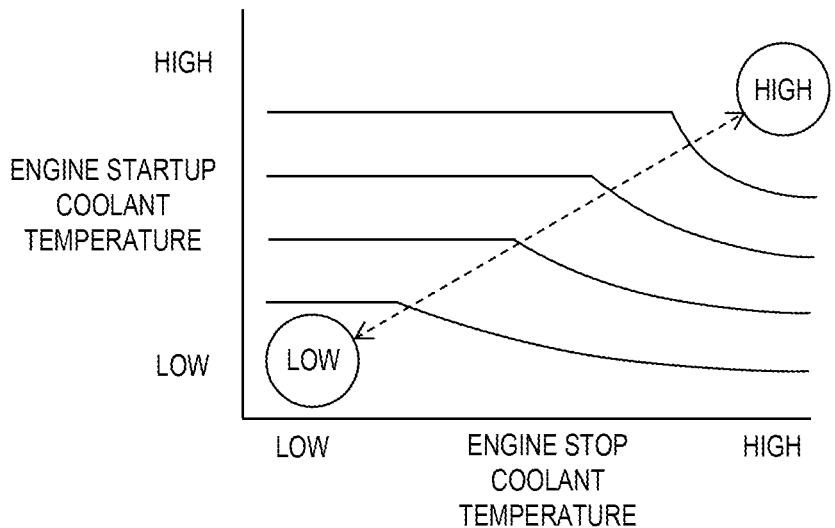
FIG. 3 is a graph for calculating an exhaust pipe temperature $T_{em}$ at a time of a startup of the engine based on an engine startup coolant temperature ethwstr and an engine stop coolant temperature ethwstp.

In step S15, the electronic control unit 200 sets the current engine coolant temperature ethw as an engine startup coolant temperature ethwstr, calculates the exhaust pipe temperature $T_{em}$ [° C.] at the time of the engine startup based on the engine startup coolant temperature ethwstr and the engine stop coolant temperature ethwstp with reference to a map of FIG. 3 created in advance by experiments or the like, and then stores in the memory.

As illustrated in the map of FIG. 3, the exhaust pipe temperature $T_{em}$ at the engine startup tends to be lower when the engine startup coolant temperature ethwstr is low than when it is high. Further, the exhaust pipe temperature $T_{em}$ at the time of the engine startup tends to be lower when the engine stop coolant temperature ethwstp is low than when it is high.

In the present embodiment, the exhaust pipe temperature $T_{em}$ is estimated based on the engine coolant temperature ethw corresponding to the temperature of the engine body 10 as described above. However, instead of the engine coolant temperature ethw, the exhaust pipe temperature $T_{em}$ may be estimated based on the temperature of another parameter (for example, the temperature of lubricant) correlated with the temperature of the engine body 10.

Figure 4:
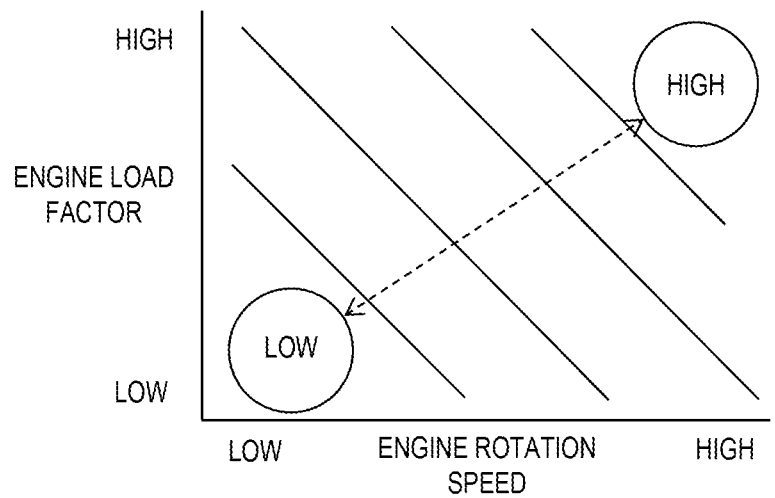
FIG. 4 is a graph for calculating a temperature change amount $\Delta T_{em}$ of the exhaust pipe temperature $T_{em}$ based on engine rotation speed $N_e$ and an engine load factor K1.

In step S16, the electronic control unit 200 calculates a temperature change amount $\Delta T_{em}$ of the exhaust pipe temperature $T_{em}$ per unit time (the calculation cycle) based on a current engine rotation speed $N_e$ [rpm] and an engine load factor K1 [%] with reference to a map of FIG. 4 created in advance by experiments or the like.

As illustrated in the map of FIG. 4, the temperature change amount $\Delta T_{em}$ of the exhaust pipe temperature $T_{em}$ tends to be greater when the engine rotation speed $N_e$ is high than when it is low. Further, the temperature change amount $\Delta T_{em}$ of the exhaust pipe temperature $T_{em}$ tends to be greater when the engine load factor K1 is high than when it is low.

In step S7, the electronic control unit 200 updates the exhaust pipe temperature $T_{em}$ by adding the temperature change amount $\Delta T_{em}$ of the exhaust pipe temperature $T_{em}$ to the exhaust pipe temperature $T_{em}$ stored in the memory, and stores the updated exhaust pipe temperature $T_{em}$ in the memory.

Figure 5:
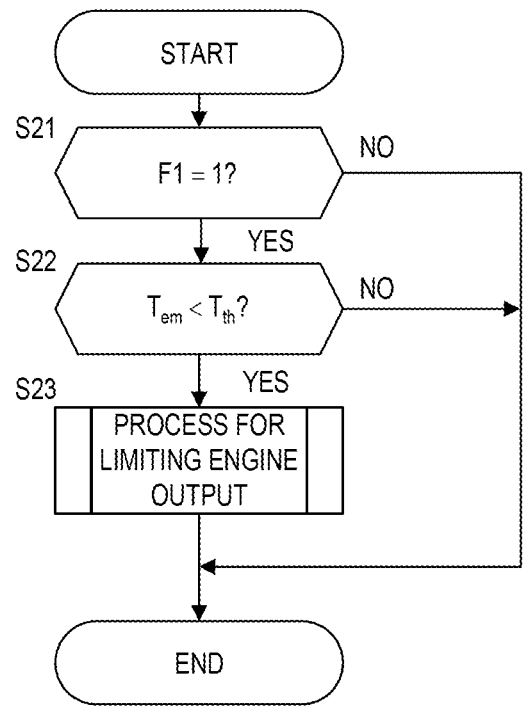
FIG. 5 is a flowchart describing output control according to an embodiment of the present disclosure.

FIG. 5 is a flowchart describing the output control according to the present embodiment. The electronic control unit 200 repeatedly executes this process at a predetermined calculation cycle (for example, 10 milliseconds).

In step S21, the electronic control unit 200 determines whether the engine is in operation. In the present embodiment, the electronic control unit 200 reads the engine operation flag F1, determines that the engine is in operation when the engine operation flag F1 is set to one, and proceeds to a process of step S22. On the other hand, when the engine operation flag F1 is set to zero, the electronic control unit 200 determines that the engine is stopped, and ends the current process.

In step S22, the electronic control unit 200 determines whether there is a possibility that condensate is generated in the exhaust pipe 22. In the present embodiment, the electronic control unit 200 reads the exhaust pipe temperature $T_{em}$ stored in the memory and determines whether the exhaust pipe temperature $T_{em}$ is lower than a predetermined condensate generation determination threshold $T_{th}$. The condensate generation determination threshold $T_{th}$ can be appropriately selected within a temperature range in which condensate can be generated in the exhaust pipe 22. In the present embodiment, the temperature is set to be 60 [° C.].

When the exhaust pipe temperature $T_{em}$ is lower than the condensate generation determination threshold $T_{th}$, the electronic control unit 200 proceeds to a process of step S23 so as to limit the engine output, as needed. On the other hand, when the exhaust pipe temperature $T_{em}$ is equal to or higher than the condensate generation determination threshold $T_{th}$, the electronic control unit 200 determines that it is not necessary to limit the engine output, and ends the current process. This is because when the exhaust pipe temperature $T_{em}$ is equal to or higher than the condensate generation determination threshold $T_{th}$, no condensate is generated in the exhaust pipe 22, or even if condensate is generated, the amount thereof is small, and thus even if the condensate is scattered on the conductive base material 151, there is no concern that the scattered condensate might cause a temperature difference in the conductive base material 151.

In step S23, the electronic control unit 200 executes a process for limiting the engine output. Details of the process for limiting the engine output will be described below with reference to FIG. 6.

Figure 6:
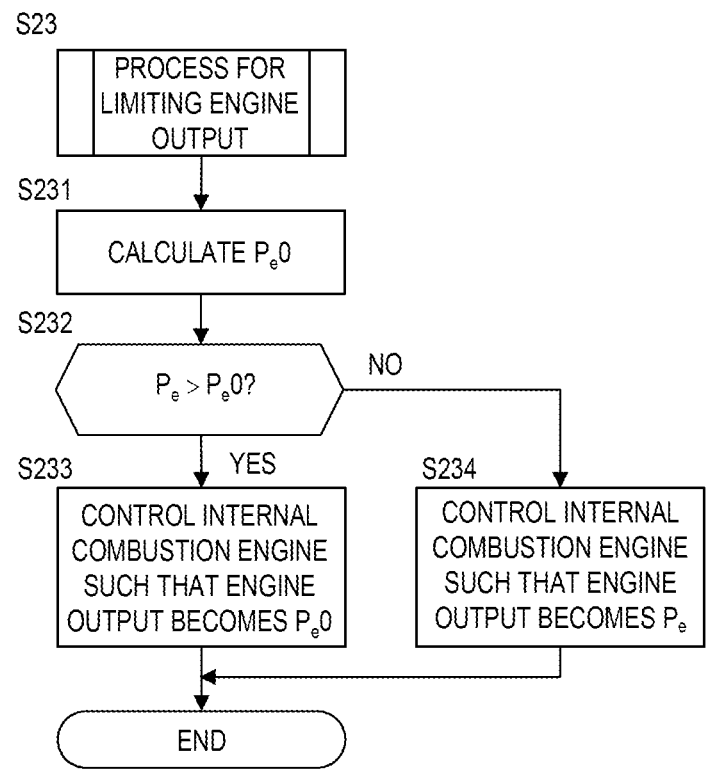
FIG. 6 is a flowchart describing details of a process for controlling an output of the engine.

FIG. 6 is a flowchart describing the details of the process for limiting the engine output.

Figure 7:
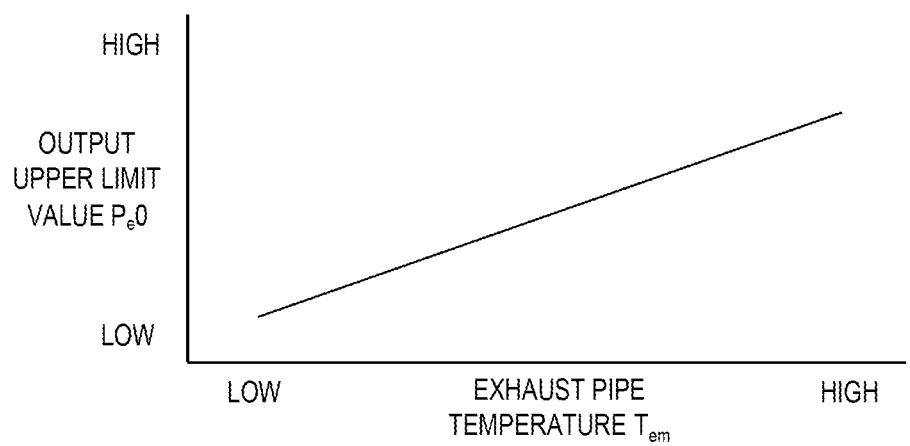
FIG. 7 is a graph for calculating an output upper limit value $P_e 0$ for the engine output based on the exhaust pipe temperature $T_{em}$.

In step S231, the electronic control unit 200 calculates an output upper limit value $P_e0$ of the engine output based on the exhaust pipe temperature $T_{em}$ stored in the memory with reference to a graph of FIG. 7 created in advance by experiments or the like.

As illustrated in the graph of FIG. 7, the output upper limit value $P_e0$ tends to become less when the exhaust pipe temperature $T_{em}$ is low than when it is high. This is because the lower the exhaust pipe temperature $T_{em}$ becomes, basically the likelier condensate tends to be generated and the greater the amount of generated condensate tends to become, and thus, in order to restrict the scattering of the condensate, it is necessary to restrict the exhaust flow rate by reducing the output upper limit value $P_e0$ as the exhaust pipe temperature $T_{em}$ becomes low.

In step S232, the electronic control unit 200 determines whether it is necessary to limit the engine output to the output upper limit value $P_e0$. In the present embodiment, the electronic control unit 200 determines whether an engine requirement output $P_e$ set based on the engine load factor K1 is greater than the output upper limit value $P_e0$. When the engine requirement output $P_e$ is greater than the output upper limit value $P_e0$, the electronic control unit 200 determines that it is necessary to limit the engine output to the output upper limit value $P_e0$ and proceeds to a process of step S233. On the other hand, when the engine requirement output $P_e$ is equal to or smaller than the output upper limit value $P_e0$, the electronic control unit 200 determines that it is not necessary to limit the engine output and proceeds to a process of step S234. The engine requirement output $P_e$ tends to increase as the engine load factor K1 increases.

In step S233, the electronic control unit 200 controls the internal combustion engine 100 such that the engine output becomes the output upper limit value $P_e0$.

In step S234, the electronic control unit 200 controls the internal combustion engine 100 such that the engine output becomes the engine requirement output $P_e$.

Figure 8:
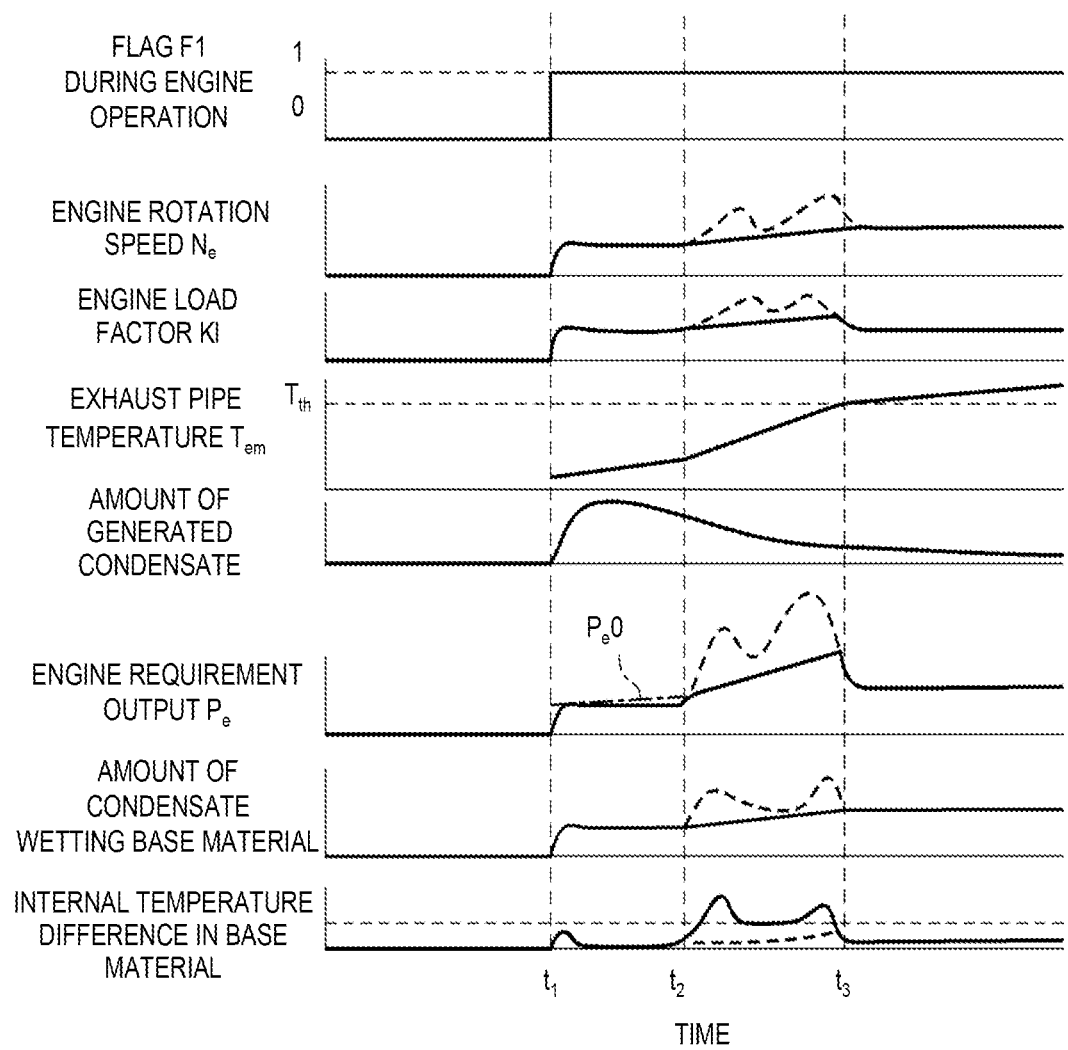
FIG. 8 is a time chart describing an operation of the output control according to the embodiment of the present disclosure.

FIG. 8 is a time chart describing an operation of the output control according to the present embodiment. In FIG. 8, for comparison, the operation where the output control according to the present embodiment is executed is represented by a solid line, and the operation where the output control according to the present embodiment is not executed is represented by a dashed line.

At time t1, when the internal combustion engine 100 is started and the flag is switched from zero to one during the engine operation, the exhaust pipe temperature $T_{em}$ at the time of the engine startup is calculated based on the engine startup coolant temperature ethwstr and the engine stop coolant temperature ethwstp. After time t1, the temperature change amount $\Delta T_{em}$ of the exhaust pipe temperature $T_{em}$ is calculated based on the engine rotation speed $N_e$ and the engine load factor K1, and the exhaust pipe temperature $T_{em}$ is updated.

From time t1 to time t3, since the exhaust pipe temperature $T_{em}$ calculated as above is lower than the condensate generation determination threshold $T_{th}$, the upper limit of the engine output is limited to the output upper limit value $P_e0$. Specifically, from time t1 to time t2, since the engine requirement output $P_e$ calculated based on the engine load factor K1 is equal to or smaller than the output upper limit value $P_e0$, the internal combustion engine 100 is controlled such that the engine output becomes the engine requirement output $P_e$. From time t2 to time 3, since the engine requirement output $P_e$ is greater than the output upper limit value $P_e0$, the internal combustion engine 100 is controlled such that the engine output becomes the output upper limit value $P_e0$.

As such, in the period from time t2 to time t3, since the engine output is limited and the exhaust flow rate is restricted, it is possible to reduce the amount of condensate pumped by the exhaust gas and scattered on the conductive base material 151 (that is, the amount of moisture wetting the conductive base material 151). Therefore, it is possible to restrict the internal temperature difference, which causes a crack, in the conductive base material 151 due to the condensate generated in the exhaust pipe 22.

In the internal combustion engine 100 according to the present embodiment described above, the exhaust pipe 22 (the exhaust passage) includes the EHC device 15 in which the catalyst is supported on the conductive base material 151 that generates heat when energized. The electronic control unit 200 (the control device) that controls the internal combustion engine 100 includes an output control unit that controls the internal combustion engine 100 such that, in a case where condensate is generated in the exhaust pipe 22 on the upstream side of the catalyst device 15 in the exhaust flow direction, the engine output becomes smaller in a region where the engine load is equal to or greater than a predetermined load than in a case where condensate is not generated.

As such, when condensate is generated in the exhaust passage, the engine output is reduced in a region where the engine load is equal to or greater than the predetermined load, and the exhaust flow rate is restricted. Accordingly, it is possible to reduce the amount of condensate pumped by the exhaust gas and scattered on the conductive base material. Therefore, it is possible to restrict partial and rapid cooling of the conductive base material 151 by the condensate generated in the exhaust passage, and it is possible to restrict an occurrence of a temperature difference, which causes a crack, in the conductive base material 151.

Specifically, the output control unit according to the present embodiment is configured to determine whether condensate is generated in the exhaust pipe 22 (in the exhaust passage) on the upstream of the catalyst device 15 in the exhaust flow direction, based on the exhaust pipe temperature $T_{em}$ (the temperature of the exhaust passage), and set, upon determining that condensate is generated, the output upper limit value $P_e0$ of the engine output based on the exhaust pipe temperature $T_{em}$. Then, the output control unit is configured to make the output upper limit value $P_e0$ less when the exhaust pipe temperature $T_{em}$ is low than when it is high.

As such, the exhaust flow rate is restricted by reducing the output upper limit value $P_e0$ of the engine output to a degree at which the exhaust pipe temperature $T_{em}$ is relatively low and condensate is likely to be generated, that is, to a degree at which the amount of generated condensate is expected to increase. Therefore, it is possible to effectively restrict the scattering of the generated condensate.

Further, the output control unit according to the present embodiment is configured to calculate the exhaust pipe temperature $T_{em}$ (the temperature of the exhaust passage) at the time of the engine startup based on the temperature of the engine body 10 when the internal combustion engine 100 is stopped or the temperature of the engine body at the time of the stop (the engine stop coolant temperature ethwstp), which is the temperature of a parameter correlated with the temperature of the engine body, and the temperature of the engine body 10 when the internal combustion engine 100 is started the subsequent time after the internal combustion engine 100 is stopped or the temperature of the engine body at the time of the startup (the engine startup coolant temperature ethwstr), which is the temperature of the parameter. In addition, the output control unit is configured to calculate the exhaust pipe temperature $T_{em}$ during the engine operation based on the exhaust pipe temperature $T_{em}$ at the time of the engine startup and the temperature change amount $\Delta T_{em}$ of the exhaust pipe temperature $T_{em}$ during the engine operation, which is calculated based on the engine operation state. As such, it is possible to easily estimate the exhaust pipe temperature $T_{em}$ without using a temperature sensor or the like.

Although the embodiments of the present disclosure have been described above, the above embodiments merely show a part of examples of application of the present disclosure, and are not meant to limit the technical scope thereof to the specific configuration of the above embodiments.

What is claimed is:

1. A control device for an internal combustion engine that includes, in an exhaust passage, an electrically heated catalyst device in which a catalyst is supported on a conductive base material that generates heat when energized, the control device comprising:
an electronic control unit configured to determine whether condensate is generated in the exhaust passage on an upstream side of the catalyst device in an exhaust flow direction, and upon determining that the condensate is generated in the exhaust passage on the upstream side of the catalyst device, the electronic control unit is configured to reduce a power output of the internal combustion engine and restrict a flow rate of exhaust gas in a region where the electronic control unit determines that a load of the internal combustion engine is equal to or greater than a predetermined load as compared with when the condensate is not generated in the exhaust passage on the upstream side of the catalyst device in the exhaust flow direction.

2. The control device according to claim 1, wherein:
the electronic control unit is configured to, upon determining that the condensate is generated, set a power output upper limit value of the power output of the internal combustion engine based on a temperature of the exhaust passage.

3. The control device according to claim 2, wherein the electronic control unit is configured to, when the temperature of the exhaust passage is low, reduce the power output upper limit value, as compared with a case where the temperature of the exhaust passage is high.

4. The control device according to claim 1, wherein the electronic control unit is configured to determine whether the condensate is generated based on a temperature of the exhaust passage.

5. The control device according to claim 2, wherein the electronic control unit is configured to calculate the temperature of the exhaust passage at a time of startup of the internal combustion engine based on a temperature of a body of the internal combustion engine when the internal combustion engine is stopped or a temperature of the body at a time of the stop, which is a temperature of a parameter correlated with the temperature of the body of the internal combustion engine, and the temperature of the body when the internal combustion engine is started a subsequent time after the internal combustion engine is stopped or the temperature of the body at the time of the startup, which is the temperature of the parameter.

6. The control device according to claim 5, wherein the electronic control unit is configured to calculate the temperature of the exhaust passage during an operation of the internal combustion engine based on an amount of a change between the temperature of the exhaust passage at the time of the startup and the temperature of the exhaust passage during the operation that is calculated based on a state of the operation.

7. A control method for an internal combustion engine that includes, in an exhaust passage, an electrically heated catalyst device in which a catalyst is supported on a conductive base material that generates heat when energized, the control method comprising:

determining, by an electronic control unit, whether condensate is generated in the exhaust passage on an upstream side of the catalyst device in an exhaust flow direction; and upon determining that condensate is generated in the exhaust passage on the upstream side of the catalyst device, reducing a power output of the internal combustion engine and restricting a flow rate of exhaust gas in a region where the electronic control unit determines that a load of the internal combustion engine is equal to or greater than a predetermined load as compared with when the condensate is not generated in the exhaust passage on the upstream side of the catalyst device in the exhaust flow direction.

* * * * *